US012311505B2

(12) United States Patent
Selleck

(10) Patent No.: US 12,311,505 B2
(45) Date of Patent: May 27, 2025

(54) TUBE NUT SOCKET TOOL WITH ANTI-DILATION FEATURE

(71) Applicant: Ford Motor Company, Dearborn, MI (US)

(72) Inventor: Michael T. Selleck, St. Clair Shores, MI (US)

(73) Assignee: Ford Motor Company, Dearborn, MI (US)

( * ) Notice: Subject to any disclaimer, the term of this patent is extended or adjusted under 35 U.S.C. 154(b) by 507 days.

(21) Appl. No.: 17/547,319

(22) Filed: Dec. 10, 2021

(65) Prior Publication Data

US 2023/0182268 A1 Jun. 15, 2023

(51) Int. Cl.
*B25B 13/48* (2006.01)
*B25B 13/06* (2006.01)

(52) U.S. Cl.
CPC .............. *B25B 13/48* (2013.01); *B25B 13/06* (2013.01)

(58) Field of Classification Search
CPC ....... B25B 13/48; B25B 13/06; B25B 13/065; B25B 13/08; B25B 13/102; B25B 13/107; B25B 13/44; B25B 13/481; B25B 13/483; B25B 13/50; B25B 13/5041; B25B 13/58; B25B 23/0035; B25B 23/005; B25B 23/0057; B25B 23/0085; B25B 23/02; B25B 23/08; B25B 23/108; B25B 23/1427; B25B 21/001; B25B 21/002; B25B 21/007; B25G 1/005; B25G 1/04; H01R 43/20; H01R 43/24; H01R 43/26
USPC ........................................................ 81/121.1
See application file for complete search history.

(56) References Cited

U.S. PATENT DOCUMENTS

| | | | | |
|---|---|---|---|---|
| 4,506,567 | A | 3/1985 | Makhlouf | |
| 5,339,710 | A | 8/1994 | Deadmond et al. | |
| 5,592,861 | A * | 1/1997 | Barmore | B25B 15/008 81/438 |
| 5,927,156 | A | 7/1999 | Landwehr, III | |
| 6,725,747 | B2 | 4/2004 | Erwin | |

(Continued)

FOREIGN PATENT DOCUMENTS

JP H0819968 1/1996

OTHER PUBLICATIONS

ECS Tuning, Injection Line Wrench—12-point Socket, Product pages, 2 pages.

(Continued)

*Primary Examiner* — Edward F Landrum
*Assistant Examiner* — Caleb Andrew Holizna
(74) *Attorney, Agent, or Firm* — Burris Law, PLLC

(57) ABSTRACT

A tool includes an input portion, socket, arm, and sleeve. The input portion receives input torque about an axis. The socket is axially spaced apart from the input portion and configured to rotate a nut about the axis. The socket defines first and second apertures that extend through opposite ends of the socket into the socket cavity. A slot is open to the socket cavity and extends axially between the first and second apertures through a perimeter of the socket. The arm connects the input portion to the socket for common rotation. The arm does not extend completely about the axis. The sleeve includes a lower portion rotatable about the socket between a first position, in which the slot is open through a side of the tool, and a second position, in which the lower portion closes the slot to inhibit spreading of the socket.

18 Claims, 4 Drawing Sheets

(56) References Cited

U.S. PATENT DOCUMENTS

| | | | | |
|---|---|---|---|---|
| 6,938,522 | B1 * | 9/2005 | Stannik .................. | H01R 43/26<br>81/124.2 |
| 7,204,174 | B1 | 4/2007 | Wood | |
| 8,978,523 | B2 | 3/2015 | Stanfield et al. | |
| 9,770,812 | B2 | 9/2017 | Jefferson | |
| 11,097,402 | B2 | 8/2021 | Machinchick et al. | |
| 2005/0031424 | A1 * | 2/2005 | Hernandez ............ | B25B 21/007<br>408/238 |
| 2005/0199103 | A1 | 9/2005 | Thompson et al. | |
| 2008/0245193 | A1 | 10/2008 | Lipka | |
| 2019/0245313 | A1 | 8/2019 | Odom | |
| 2020/0130148 | A1 * | 4/2020 | Machinchick ........ | B25B 13/481 |

OTHER PUBLICATIONS

Schley Products, 13400-12-Point ⅜" Drive Injector Line Socket Set, Product pages, 6 pages.

* cited by examiner

TUBE NUT SOCKET TOOL WITH ANTI-DILATION FEATURE

FIELD

The present disclosure relates to a socket tool, and more particularly, a socket tool for connecting a tube nut or similar connection.

BACKGROUND

The statements in this section merely provide background information related to the present disclosure and may not constitute prior art.

Tube nut connections require a tool (e.g., a wrench) with an open top to accommodate the tube and an open side slot so that the tool can be removed after assembly. Some tube nut connections are in tight spaces not accessible by traditional wrenches. In some situations, corrosion, debris, or other factors can cause a tube nut to become stuck such that high amounts of torque can be required to remove the nut. The high torque can cause the two prongs of the wrench that define the open side slot to spread apart, causing the wrench to slip on the nut, the nut to deform, or the tool to be damaged.

The teachings of the present disclosure address these and other issues with traditional wrenches for tube nut connections. Similar issues can arise with other types of connections where a nut connects two components on opposite axial sides of the nut, such as a threaded wiring connection or a hose connection. Accordingly, the teachings of the present disclosure also address these issues in such similar connections.

SUMMARY

This section provides a general summary of the disclosure and is not a comprehensive disclosure of its full scope or all of its features.

According to one form, the present teachings provide for a tool that includes a main body and a sleeve. The main body includes an input portion, a first arm, and a pair of prongs. The input portion is configured to receive input torque about an axis. A proximal end of the first arm is coupled to the input portion for common rotation therewith about the axis. The pair of first prongs are coupled to a distal end of the first arm for common rotation therewith about the axis. The pair of first prongs define a plurality of socket surfaces that cooperate to define a socket cavity. The socket surfaces are configured to engage and rotate a nut about the axis. The pair of first prongs define a first slot open to the socket cavity. The socket cavity is open through the first prongs in both axial directions of the axis. The sleeve includes a lower portion disposed radially outward of the first prongs relative to the axis. The sleeve is movable relative to the main body between a first position, in which the first slot is open through a side of the tool, and a second position, in which the lower portion closes the first slot and extends around at least a portion of each first prong to inhibit spreading of the first prongs.

In another form, the lower portion includes a pair of second prongs, proximal ends of each second prong being coupled together such that the second prongs extend in opposite circumferential directions about the axis to corresponding distal ends of each second prong, the distal ends of the second prongs being spaced apart to define a second slot, wherein when the sleeve is in the first position, the first slot and the second slot align such that the socket cavity is open through the side of the tool.

In yet another form, the first arm does not extend completely about the axis in a circumferential direction relative to the axis.

In still another form, the sleeve includes a ring and a second arm, the ring being disposed about the input portion for rotation relative thereto, the second arm coupling the ring to the lower portion for common rotation with the ring.

In a further form, the first arm does not extend completely in a circumferential direction about the axis and the second arm does not extend completely in the circumferential direction about the axis.

In still a further form, the input portion defines a first shoulder and the ring defines a second shoulder that opposes the first shoulder to support the sleeve on the main body.

In yet a further form, the tool includes a clip that engages the input portion and inhibits axial movement of the ring in an axial direction away from the first shoulder.

In another form, the input portion defines a circumferential groove and the clip is received in the circumferential groove and extends radially outward therefrom.

In still another form, an outer circumferential surface of the ring is knurled.

In yet another form, the main body and the sleeve cooperate to define a detent, the detent being configured to inhibit rotation of the sleeve relative to the main body out of the second position.

In a further form, an outer surface of each first prong cooperates to define a first cylindrical shape open through the first slot, the cylindrical shape having a first diameter D1 and a radially inward surface of the lower portion of the sleeve is a second diameter D2, wherein $D1 \leq D2 \leq D1+X$, wherein $X=0.01*D1$.

In still a further form, the input portion defines a square aperture configured to receive a driver.

In yet a further form, the first prongs define an upper aperture open to the socket cavity and disposed axially between the input member and the socket cavity, wherein the socket cavity extends radially outward of the upper aperture to define a shoulder configured to inhibit the nut from exiting the socket cavity through the upper aperture.

In another form, the lower portion of the sleeve engages a shoulder proximate the first prongs, the shoulder inhibiting axial movement of the lower portion relative to the first prongs.

In yet another form, the tool includes a clip coupled to the main body, wherein the shoulder is disposed on the clip.

According to yet another form, the teachings of the present disclosure provide for a tool including a main body and a sleeve. The main body includes an input portion, a first arm, and a pair of prongs. The input portion defines a plurality of driving surfaces arranged about a rotational axis of the tool. The driving surfaces are configured to receive input torque from a driver tool to rotate the main body about the rotational axis. The first arm extends axially from the input portion to a distal end of the first arm. The first arm does not extend completely about the rotational axis in a circumferential direction. Each of the first prongs extends from the distal end of the first arm to a distal end the first prong. The first prongs define a plurality of socket surfaces that cooperate to define a socket cavity. The socket surfaces are configured to engage and rotate a nut about the rotational axis. The distal ends of the first prongs are spaced apart to define a first slot open to the socket cavity. The socket cavity is open through the first prongs in both axial directions of the rotational axis. The sleeve includes a lower portion having a pair of second prongs. Proximal ends of each second prong are coupled together such that the second prongs extend in opposite circumferential directions about the first prongs to corresponding distal ends of each second prong. The distal ends of the second prongs are spaced apart to define a second slot. The sleeve is movable relative to the main body between a first position, in which the first slot and the second slot are aligned, and a second position, in which the first slot and the second slot are not aligned such that the lower portion closes the first slot and extends around at least a portion of each first prong to inhibit spreading of the first prongs.

In another form, the sleeve includes a top portion and a second arm, the top portion being disposed about the input portion for rotation relative thereto, the second arm coupling the top portion to the lower portion for common rotation with the top portion, wherein the second arm does not extend completely about the rotational axis in the circumferential direction.

In still another form, the input portion defines a first shoulder and the top portion defines a second shoulder that opposes the first shoulder to support the sleeve on the main body.

In yet another form, the tool includes a clip that engages the input portion and inhibits axial movement of the top portion in an axial direction away from the first shoulder.

According to still another form, the present teachings provide for a tool including an input portion, a socket, a first arm, and a sleeve. The input portion is configured to receive input torque about an axis. The socket is axially spaced apart from the input portion and includes a plurality of socket surfaces that define a socket cavity configured to receive a nut. The socket surfaces are configured to engage and rotate the nut about the axis. The socket defines a first aperture, a second aperture, and a first slot. The first aperture extends through a first axial end of the socket and is open to the socket cavity. The second aperture extends through a second axial end of the socket and is open to the socket cavity such that the socket cavity is open through the socket in both axial directions of the axis. The first slot is open to the socket cavity and extends axially from the first aperture to the second aperture through a perimeter of the socket. The first arm connects the input portion to the socket for common rotation about the axis. The first arm does not extend completely about the axis in a circumferential direction. The sleeve includes a lower portion disposed radially outward of the socket relative to the axis. The sleeve is rotatable relative to the socket between a first position, in which the first slot is open through a side of the tool, and a second position, in which the lower portion closes the first slot and extends around at least a portion of the socket on opposite sides of the first slot to inhibit spreading of the socket.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
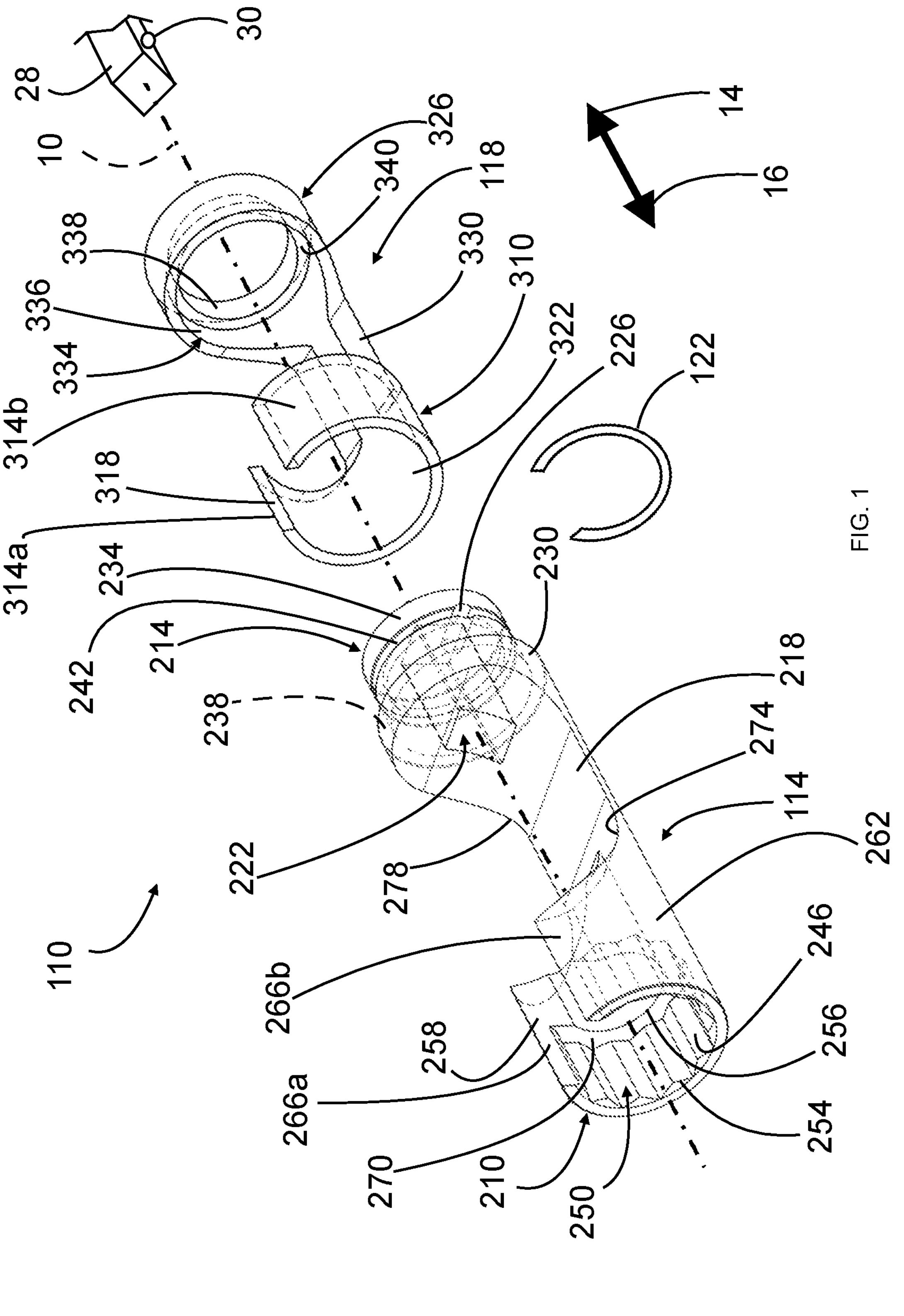
FIG. 1 is an exploded perspective view of a socket tool in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
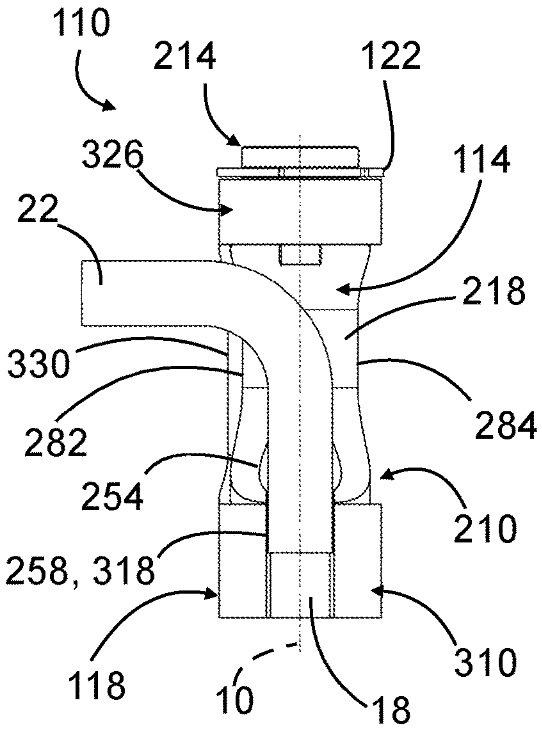
FIG. 2 is a front view of the socket tool of FIG. 1, illustrated with a sleeve of the socket tool in a first rotational position in accordance with the teachings of the present disclosure.

Referring to FIGS. 1 and 2, a socket tool 110 is illustrated in accordance with the teachings of the present disclosure. The socket tool 110 includes a main body 114 and a sleeve 118. The socket tool 110 may also optionally include a clip 122.

The main body 114 includes a socket 210, an input portion 214, and a first arm 218 that connects the socket 210 to the input portion 214. The input portion 214 is configured to receive input torque about a rotational axis 10. In the example provided, the input portion 214 defines an input aperture 222 having a predetermined shape that is configured to matingly receive an output protrusion 28 of a driver or other tool, such as the output of a ratchet wrench or torque wrench for example. The input aperture 222 is centered on the axis 10.

In the example provided, the input aperture 222 is a square shape defined by four input surfaces, though other shapes can be used. In an alternative configuration, not specifically shown, the input aperture 222 can be replaced with an input protrusion having a plurality of external input surfaces in a predetermined shape configured to be received in a mating aperture of a driver or other tool.

The input portion 214 may optionally include an input detent aperture 226 through one of the sides of the square shape to receive a detent member 30 (e.g., a ball) on the output protrusion 28.

In the example provided, the input aperture 222 extends axially entirely through the input portion 214. In an alternative configuration, not specifically shown, the input aperture 222 may be a blind aperture that terminates within the input portion 214.

In the example provided, the input portion 214 has a circular cylindrical base 230 disposed about the axis 10 and a circular cylindrical boss 234 that is concentric with the base 230 and extends axially therefrom in a first axial direction 14. The boss 234 has a diameter that is less than the diameter of the base 230 such that the top surface of the base 230 forms a shoulder 238 having an annular shape disposed about the boss 234 and facing in the first axial direction 14.

In the example provided, the input portion 214 may optionally define a circumferential groove 242 disposed about an outer circumferential surface of the boss 234 and configured to receive the clip 122. In the example provided, the clip 122 is a resilient C-shaped clip and is configured to snap into the groove 242 such that at least a portion of the clip 122 extends radially outward of the groove 242 when received in the groove 242.

The socket 210 is axially offset (i.e., spaced apart) from the input portion 214 and includes a plurality of socket surfaces 246 (one of which is labeled) disposed about the axis 10 that cooperate to define a socket cavity 250 centered on the axis 10. The socket surfaces 246 are arranged in a predetermined pattern configured to matingly receive and engage a nut 18 to rotate the nut 18 about the axis 10. In the example provided, the predetermined pattern is a twelve point star pattern about the axis 10 and the nut 18 is a hexagonal nut, though other configurations can be used, such as a hexagonal pattern, a square pattern, or other shapes configured matingly engage a nut of a predetermined shape.

The socket 210 defines a first aperture 254 and a second aperture 256 and a first slot 258. The first aperture 254 extends through a first axial end of the socket 210 and is open into the socket cavity 250. The second aperture 256 extends through a second axial end (i.e., opposite the first axial end) of the socket 210 and is open into the socket cavity 250. The first axial end is proximate the input portion 214 while the second axial end is distal the input portion 214. Thus, the socket cavity 250 is open in both axial directions 14, 16. The first slot 258 is open to the socket cavity 250 and extends axially from the first aperture 254 to the second aperture 256 and extends radially through a perimeter surface 262 of the socket 210.

In other words, the first slot 258 separates the socket 210 into two prongs 266*a*, 266*b* that have proximal ends that are connected on a back of the socket 210 and extend in opposite circumferential directions about the axis 10 to corresponding distal ends of each prong 266*a*, 266*b* that are spaced apart to define the first slot 258 on the front of the socket 210. In other words, each prong 266*a*, 266*b* of the pair of prongs 266*a*, 266*b* can have some of the socket surfaces 246 such that the pair of prongs 266*a*, 266*b* cooperate to define the socket cavity 250.

The nut 18 can be received into the socket cavity 250 via the second aperture 256 and a component 22 to be attached via the nut 18 can extend from the nut 18 through the first aperture 254, as shown in FIG. 2. In the example provided, the component 22 to be attached via the nut 18 is a tube having a bend, though other types of components can be used, such as wires (not shown) or a hose (not shown) for example. The first aperture 254 can optionally have a diameter that is less than that of the socket cavity 250 such that the socket 210 includes a shoulder 270 that inhibits the nut 18 from exiting the socket cavity 250 via the first aperture 254.

The first arm 218 extends axially between the input portion 214 and the socket 210 to couple the socket 210 to the input portion 214 for common rotation about the axis 10. A proximal end of the first arm 218 is coupled to the back side of the base 230 of the input portion 214. A distal end of the first arm 218 is coupled to the back side the first end of the socket 210. The first arm 218 does not extend completely about the axis 10 in the circumferential direction about the axis 10 so that the component 22 can exit the tool 110 between the input portion 214 and the socket 210, i.e., via the opening generally defined by the input portion 214, the first arm 218, and the socket 210.

In the example provided, the first arm 218 optionally smoothly transitions with a fillet 274 into each prong 266*a*, 266*b* at the first end of the socket 210. The fillet 274 provides additional rigidity and strength to the prongs 266*a*, 266*b*. Similarly, the first arm 218 may optionally smoothly transition with a fillet 278 into the base 230 of the input portion 214 to increase rigidity of the main body 114.

In the example provided, the main body 114 is a single piece of material and may be unitarily formed, such as via casting, forging, machining or combinations thereof for example. In an alternative form, not specifically shown, other configurations can be used such as attaching separate pieces together via welding or fasteners for example.

Referring to FIGS. 1-5, the sleeve 118 includes a lower portion 310 disposed about the socket 210 and rotatable relative to the socket 210 between a first position (shown in FIGS. 2 and 4), in which the first slot 258 is open through a side (e.g., the front) of the tool 110, and a second position (shown in FIGS. 3 and 5), in which the lower portion 310 closes the first slot 258 and extends around at least a portion of each prong 266*a*, 266*b* to inhibit spreading of the prongs 266*a*, 266*b* when torque is applied to the nut 18.

In the example provided, the lower portion 310 includes a pair of prongs 314*a*, 314*b*. Each prong 314*a*, 314*b* has a corresponding proximal end coupled together at one side (e.g., the back) of the lower portion 310 and the prongs 314*a*, 314*b* extend in opposite circumferential directions about the axis 10 to corresponding distal ends of each prong 314*a*, 314*b* that are spaced apart to define a second slot 318.

The lower portion 310 is coupled to the main body 114 in a manner that permits the lower portion 310 to rotate about the axis between the first position (shown in FIGS. 2 and 4), in which the first slot 258 aligns with the second slot 318, and the second position (shown in FIGS. 3 and 5), in which one of the prongs 314*a*, 314*b* covers the first slot 258 and wraps over at least part of both prongs 266*a*, 266*b* to inhibit spreading of the prongs 266*a*, 266*b*.

For example, the outer perimeter surface 262 of each prong 266*a*, 266*b* of the socket 210 can define a circular cylindrical shape, broken up by the first slot 258, that has a first diameter D1, while the radially inward surface 322 of the lower portion 310 of the sleeve 118 has a circular cylindrical shape, broken up by the second slot 318, having a diameter D2 that is slightly larger than D1. In other words, $D1 \leq D2 \leq D1+X$, wherein X is a clearance that is not large enough for the prongs 266*a*, 266*b* to spread enough such that the socket surfaces 246 would slip past the corners of the nut 18 or otherwise damage the nut 18. In one form the clearance X may be no greater than 1% of D1, i.e., $X=0.01*D1$, though other clearances may be used.

The sleeve 118 may optionally include an upper portion 326 and a second arm 330 connecting the upper portion 326 to the lower portion 310. In the example provided, the upper portion 326 is a ring that extends circumferentially about the axis 10. In the example provided, the upper portion 326 defines a stepped or counterbored aperture 334 that has a primary bore 336 and a major bore 338 that is concentric with but larger than the primary bore such that the counterbored aperture 334 defines a shoulder 340 that faces in the second axial direction 16.

The primary bore 336 has a diameter that is slightly larger than (e.g., a clearance fit) the boss 234 and the major bore 338 has a diameter that is slightly larger than (e.g., clearance fit) the base 230 such that the upper portion 326 can be slid over the input portion 214. The shoulder 340 can oppose and contact the shoulder 238 in a sliding manner such as to inhibit the sleeve 118 from moving further in the second axial direction 16 while permitting the sleeve 118 to rotate relative to the main body 114 about the axis 10.

In the example provided, the top of the boss 234 of the input portion 214 protrudes from the primary bore 336 such that the groove 242 is exterior of the upper portion 326. The clip 122 is received in the groove 242 and protrudes from the groove 242 to inhibit the sleeve from moving axially in the first axial direction 14, i.e., away from the shoulder 238. In this way, the clip 122 provides another shoulder to inhibit axial movement of the sleeve 118.

The second arm 330 extends axially between the upper portion 326 and the lower portion 310 to couple the upper portion 326 to the lower portion 310 for common rotation about the axis 10. A proximal end of the second arm 330 is coupled to the upper portion 326 near the back side of the upper portion 326. A distal end of the second arm 330 is coupled to the lower portion 310 near the back side the lower portion 310. The second arm 330 does not extend completely about the axis 10 in the circumferential direction about the axis 10 so that the component 22 can exit the tool 110 between the upper portion 326 and the lower portion 310, i.e., via the opening generally defined by the upper portion 326, the second arm 330, and the lower portion 310.

Figure 3:
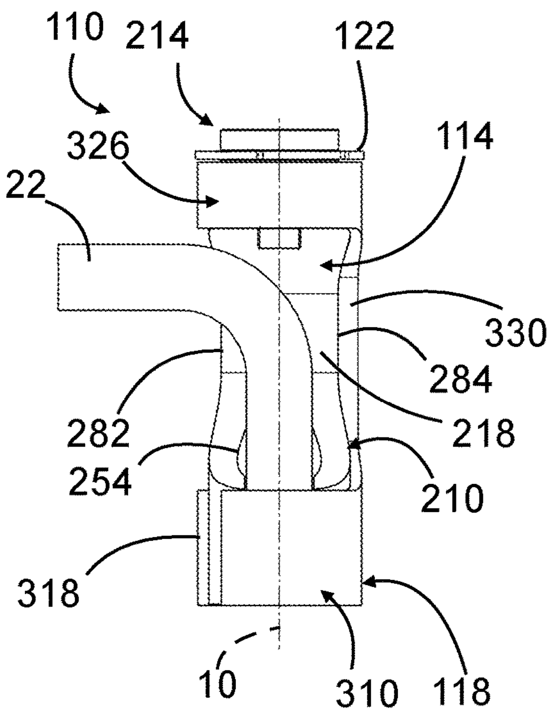
FIG. 3 is a front view of the socket tool of FIG. 1, illustrated with the sleeve of the socket tool in a second rotational position in accordance with the teachings of the present disclosure.
Figure 4:
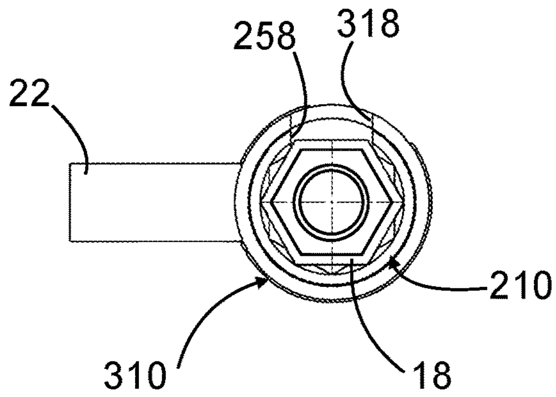
FIG. 4 is a bottom view of the socket tool of FIG. 1, illustrated in the first rotational position.
Figure 5:
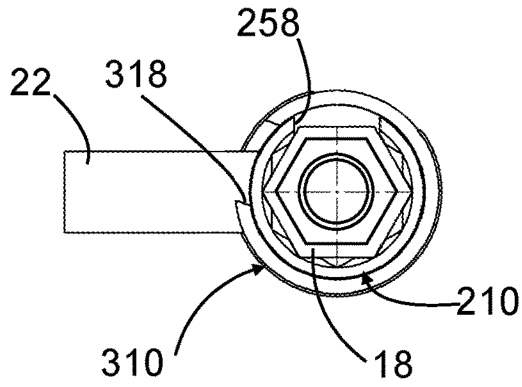
FIG. 5 is a bottom view of the socket tool of FIG. 1, illustrated in the second rotational position.
Figure 6:
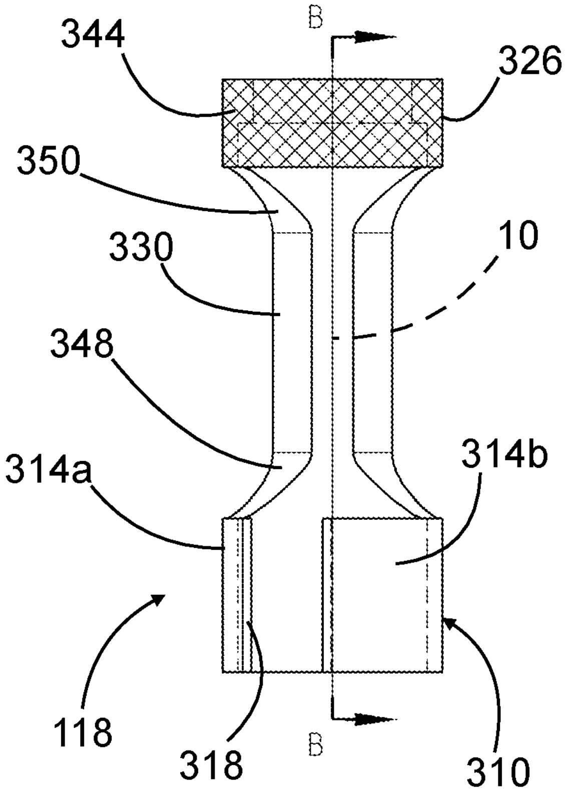
FIG. 6 is a front view of a sleeve of the socket tool of FIG. 1.

With continued reference to FIGS. 2 and 3 and additional reference to FIG. 6, the second slot 318 may optionally be rotationally positioned relative to the second arm 330 such that the second slot 318 is not centered on a plane B the passes through the center of the second arm 330 and the axis 10. In other words, the second slot 318 may optionally be rotationally offset from being diametrically opposite the second arm 330. In other words, one of the prongs 314*a*, 314*b* may extend further in the circumferential direction about the axis 10 than the other prong 314*a*, 314*b*. In the example provided, as best shown in FIGS. 2 and 3, the second arm 330 may be positioned such that it overlaps a first edge 282 of the first arm 218 but not the opposite second edge 284 when in the first position (FIG. 2) and then overlaps the second edge 284 but not the first edge 282 when in the second position (FIG. 3).

In an alternative configuration, not specifically shown, the second slot 318 may be rotationally offset in the opposite rotational direction. In yet another alternative configuration, not specifically shown, the second slot 318 may be rotationally positioned such that it is centered on the plane B.

Referring to FIG. 6, an outer perimeter surface 344 of the upper portion 326 may optionally include knurling or other texture to provide an easy to grip surface for an operator (not shown) to rotate the sleeve 118 relative to the main body 114 (FIG. 1). The second arm 330 also optionally smoothly transition with a fillet 348 into each prong 314*a*, 314*b* of the lower portion 310. The fillet 348 provides additional rigidity and strength to the prongs 314*a*, 314*b*. Similarly, the second arm 330 may optionally smoothly transition with a fillet 350 into the upper portion 326 to increase rigidity of the sleeve 118.

While the upper portion 326 can provide a convenient location for an operator to rotate the sleeve, other configurations which secure the lower portion 310 to the socket 210 (FIG. 1) for rotation relative to the socket 210 (FIG. 1) while omitting the second arm 330 and upper portion 326 can be used.

Figure 8:
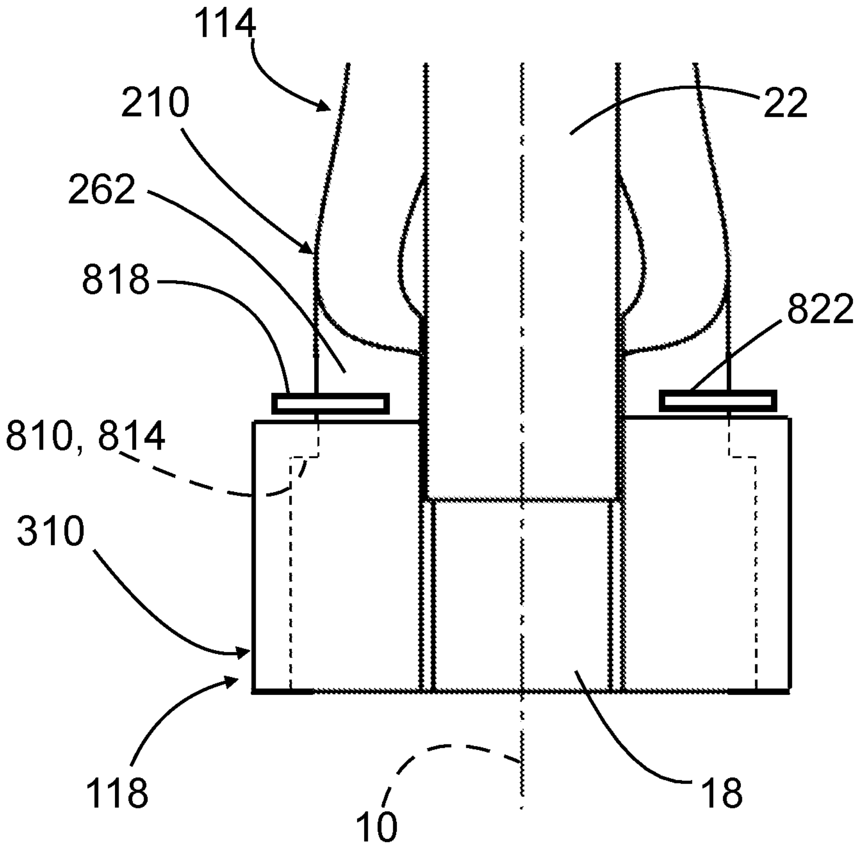
FIG. 8 is a front view of a portion of a socket tool of a second configuration in accordance with the teachings of the present disclosure.

In one alternative configuration, shown in FIG. 8, the lower portion 310 may define a shoulder 810 that opposes a shoulder 814 on the outer perimeter surface 262 of the socket 210 and a clip 818 (e.g., similar to clip 122 shown in FIG. 1) can be received in a groove 822 on the outer perimeter surface 262 of the socket 210 such that the clip 818 is an upper shoulder that retains the lower portion 310 on the socket 210 in conjunction with the shoulder 814.

In another alternative configuration, not specifically shown, the lower portion 310 may be axially secured to the socket 210 by a pair of clips (not shown, e.g., similar to clip 122 or 818) received in corresponding grooves (not shown, e.g., similar to groove 242 or 822) formed on the outer perimeter surface 262 of the socket 210 (FIG. 1) on opposite axial ends of the lower portion 310.

Figure 7:
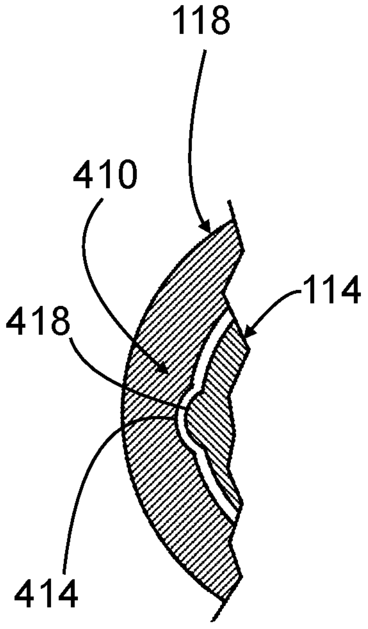
FIG. 7 is a cross-sectional view of a portion of an example detent for use with the socket tool of FIG. 1 in accordance with the teachings of the present disclosure.

With additional reference to FIG. 7, the main body 114 and the sleeve 118 may optionally cooperate to define a detent 410. The detent 410 can be any suitable type of detent that can inhibit rotation of the sleeve 118 relative to the main body 114, once the sleeve 118 is in the second position (FIGS. 3 and 5), if a torque applied to the sleeve 118 is less than a predetermined threshold torque while permitting rotation of the sleeve 118 out of the second position if the torque on the sleeve 118 is greater than the threshold torque. In the example shown, the sleeve 118 may define a recess or indent 414 and the main body 114 may define a nub or protrusion 418 that is configured to be received in the recess or indent 414 when the sleeve 118 is in the second position. In the example provided, the protrusion 418 is a rounded or ramped bump and the indent is a rounded or ramped recess to facilitate the protrusion 418 sliding into and out of the indent 414. In an alternative configuration, not specifically shown, the main body 114 may define the recess or indent 414 and the sleeve 118 may define the nub or protrusion 418 that is configured to be received in the recess or indent 414 when the sleeve 118 is in the second position. While one example form of a detent is illustrated in FIG. 7, those of skill in the art will appreciate that other types of known detents (e.g., ball and spring) may be used.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tool comprising:

a monolithic main body including:

an input portion configured to receive input torque about an axis;

a first arm, wherein a proximal end of the first arm is coupled to the input portion for common rotation therewith about the axis; and a pair of first prongs coupled to a distal end of the first arm for common rotation therewith about the axis, the pair of first prongs defining a plurality of socket surfaces that cooperate to define a socket cavity, the socket surfaces being configured to engage and rotate a nut about the axis, the pair of first prongs defining a first slot open to the socket cavity, the socket cavity being open through the first prongs in both axial directions of the axis; and a sleeve including a lower portion disposed radially outward of the first prongs relative to the axis, the sleeve being movable relative to the main body between a first position, in which the first slot is open through a side of the tool, and a second position, in which the lower portion closes the first slot and extends around at least a portion of each first prong to inhibit spreading of the first prongs.

2. The tool according to claim 1, wherein the lower portion includes a pair of second prongs, proximal ends of each second prong being coupled together such that the second prongs extend in opposite circumferential directions about the axis to corresponding distal ends of each second prong, the distal ends of the second prongs being spaced apart to define a second slot, wherein when the sleeve is in the first position, the first slot and the second slot align such that the socket cavity is open through the side of the tool.

3. The tool according to claim 1, wherein the first arm does not extend completely about the axis in a circumferential direction relative to the axis.

4. The tool according to claim 1, wherein the sleeve includes a ring and a second arm, the ring being disposed about the input portion for rotation relative thereto, the second arm coupling the ring to the lower portion for common rotation with the ring.

5. The tool according to claim 4, wherein the first arm does not extend completely in a circumferential direction about the axis and the second arm does not extend completely in the circumferential direction about the axis.

6. The tool according to claim 4, wherein the input portion defines a first shoulder and the ring defines a second shoulder that opposes the first shoulder to support the sleeve on the main body.

7. The tool according to claim 6 further comprising a clip that engages the input portion and inhibits axial movement of the ring in an axial direction away from the first shoulder.

8. The tool according to claim 7, wherein the input portion defines a circumferential groove and the clip is received in the circumferential groove and extends radially outward therefrom.

9. The tool according to claim 4, wherein an outer circumferential surface of the ring is knurled.

10. The tool according to claim 1, wherein the main body and the sleeve cooperate to define a detent, the detent being configured to inhibit rotation of the sleeve relative to the main body out of the second position.

11. The tool according to claim 1, wherein an outer surface of each first prong cooperates to define a first cylindrical shape open through the first slot, the first cylindrical shape having a first diameter D1 and a radially inward surface of the lower portion of the sleeve is a second diameter D2, wherein $D1 \leq D2 \leq D1+X$, wherein $X=0.01*D1$.

12. The tool according to claim 1, wherein the input portion defines a square aperture configured to receive a driver.

13. The tool according to claim 1, wherein the first prongs define an upper aperture open to the socket cavity and disposed axially between the input portion and the socket cavity, wherein the socket cavity extends radially outward of the upper aperture to define a shoulder configured to inhibit the nut from exiting the socket cavity through the upper aperture.

14. A tool comprising:

a monolithic main body including:

an input portion defining a plurality of driving surfaces arranged about a rotational axis of the tool, the driving surfaces configured to receive input torque from a driver tool to rotate the main body about the rotational axis;

a first arm that extends axially from the input portion to a distal end of the first arm, wherein the first arm does not extend completely about the rotational axis in a circumferential direction; and a pair of first prongs, each of the first prongs extends from the distal end of the first arm to a distal end the first prong, the first prongs defining a plurality of socket surfaces that cooperate to define a socket cavity, the socket surfaces being configured to engage and rotate a nut about the rotational axis, the distal ends of the first prongs being spaced apart to define a first slot open to the socket cavity, the socket cavity being open through the first prongs in both axial directions of the rotational axis; and a sleeve including a lower portion having a pair of second prongs, proximal ends of each second prong being coupled together such that the second prongs extend in opposite circumferential directions about the first prongs to corresponding distal ends of each second prong, the distal ends of the second prongs being spaced apart to define a second slot, the sleeve being movable relative to the main body between a first position, in which the first slot and the second slot are aligned, and a second position, in which the first slot and the second slot are not aligned such that the lower portion closes the first slot and extends around at least a portion of each first prong to inhibit spreading of the first prongs.

15. The tool according to claim 14, wherein the sleeve includes a top portion and a second arm, the top portion being disposed about the input portion for rotation relative thereto, the second arm coupling the top portion to the lower portion for common rotation with the top portion, wherein the second arm does not extend completely about the rotational axis in the circumferential direction.

16. The tool according to claim 15, wherein the input portion defines a first shoulder and the top portion defines a second shoulder that opposes the first shoulder to support the sleeve on the main body.

17. The tool according to claim 16 further comprising a clip that engages the input portion and inhibits axial movement of the top portion in an axial direction away from the first shoulder.

18. A tool comprising:

an input portion configured to receive input torque about an axis;

a socket axially spaced apart from the input portion and including a plurality of socket surfaces that define a socket cavity configured to receive a nut, the socket surfaces being configured to engage and rotate the nut about the axis, the socket defining a first aperture, a second aperture, and a first slot, the first aperture extending through a first axial end of the socket and being open to the socket cavity and the second aperture extending through a second axial end of the socket and being open to the socket cavity such that the socket cavity is open through the socket in both axial directions of the axis, the first slot being open to the socket cavity and extending axially from the first aperture to the second aperture through a perimeter of the socket;

a first arm connecting the input portion to the socket for common rotation about the axis, wherein the first arm does not extend completely about the axis in a circumferential direction, the input portion, the socket, and the first arm forming a monolithic main body; and a sleeve including a lower portion disposed radially outward of the socket relative to the axis, the sleeve being rotatable relative to the socket between a first position, in which the first slot is open through a side of the tool, and a second position, in which the lower portion closes the first slot and extends around at least a portion of the socket on opposite sides of the first slot to inhibit spreading of the socket.

* * * * *